(12) United States Patent
Heinrich et al.

(10) Patent No.: US 9,914,272 B2
(45) Date of Patent: Mar. 13, 2018

(54) METHOD OF SEPARATING EXCESS LENS FORMING MATERIAL FROM A MOLDED OPHTHALMIC LENS, IN PARTICULAR A CONTACT LENS

(71) Applicant: Novartis AG, Basel (CH)

(72) Inventors: Axel Heinrich, Aschaffenburg (DE);
Bernhard Seiferling, Goldbach (DE);
Peter Hagmann, Erlenbach am Main (DE)

(73) Assignee: Novartis AG, Basel (CH)

( * ) Notice: Subject to any disclaimer, the term of this patent is extended or adjusted under 35 U.S.C. 154(b) by 704 days.

(21) Appl. No.: 14/216,946

(22) Filed: Mar. 17, 2014

(65) Prior Publication Data
US 2014/0199425 A1    Jul. 17, 2014

Related U.S. Application Data

(63) Continuation of application No. 12/969,689, filed on Dec. 16, 2010, now Pat. No. 8,673,187.
(Continued)

(51) Int. Cl.
*B29D 11/00* (2006.01)
*B29C 33/00* (2006.01)
(Continued)

(52) U.S. Cl.
CPC ........ *B29D 11/00413* (2013.01); *B29C 33/00* (2013.01); *B29C 71/0009* (2013.01); *B29D 11/00125* (2013.01); *B29D 11/00586* (2013.01); *B29C 37/02* (2013.01); *B29C 2071/0027* (2013.01); *B29C 2071/0045* (2013.01); *B29L 2011/0041* (2013.01)

(58) Field of Classification Search
CPC ........ B29D 11/00413; B29D 11/00125; B29D 11/00586; B29C 33/00; B29C 37/02; B29C 71/0009
See application file for complete search history.

(56) References Cited

U.S. PATENT DOCUMENTS 5,160,749 A    11/1992  Fogarty
5,316,700 A    5/1994   Soye
(Continued)

FOREIGN PATENT DOCUMENTS

EP    0468154 A2    1/1992
WO    9713635 A1    4/1997
(Continued)

*Primary Examiner* — Mathieu Vargot
(74) *Attorney, Agent, or Firm* — Robert A. Ambrose

(57) ABSTRACT

There is described a method of separating excess lens forming material from a molded ophthalmic lens, in particular a contact lens. After polymerization and/or cross-linking of a lens forming material (P) within a mold cavity (4) of a mold (1) comprising female and male mold halves (2, 3) to form an ophthalmic lens non-polymerized and/or non-cross-linked lens forming material is flushed away from the mold halves (2, 3) with a jet of a fluid flushing medium, such as, e.g., water or a solvent or an inert gas. Subsequently the molded lens is dried. In accordance with the invention the flushing is accomplished with the mold halves (2, 3) still in the closed position. There is also described an apparatus for carrying out the method.

5 Claims, 1 Drawing Sheet

Related U.S. Application Data

(60) Provisional application No. 61/287,265, filed on Dec. 17, 2009.

(51) Int. Cl.
*B29C 71/00* (2006.01)
*B29C 37/02* (2006.01)
*B29L 11/00* (2006.01)

(56) References Cited

U.S. PATENT DOCUMENTS 5,616,184 A 4/1997 Duncan
2007/0243287 A1* 10/2007 Su et al. ................ B29D 11/00
425/808

FOREIGN PATENT DOCUMENTS

WO 9842497 A2 10/1998
WO 03035356 A1 5/2003

* cited by examiner

METHOD OF SEPARATING EXCESS LENS FORMING MATERIAL FROM A MOLDED OPHTHALMIC LENS, IN PARTICULAR A CONTACT LENS

This application is a continuation of U.S. patent application Ser. No. 12/969,689, filed Dec. 16, 2010 now U.S. Pat. No. 8,673,187, which claims the benefit under 35 U.S.C. § 119 (e) of U.S. provisional Application No. 61/287,265, filed on Dec. 17, 2009, each of which is incorporated by reference in its entirety.

FIELD

The invention relates to a method of separating excess lens forming material from a molded ophthalmic lens, in particular a contact lens. The invention also relates to an apparatus for carrying out the method.

BACKGROUND

It is well established in the art to produce ophthalmic lenses, more specifically hard and soft contact lenses, in an automated manufacture process with reusable molds. In mass production of contact lenses, specifically so-called disposable lenses, a large number of contact lenses must be manufactured in a relatively short period of time. In an advantageous method of mass production, a lens forming material, e.g., a polymer or prepolymer solution is introduced into a female mold half, the casting mold is closed by the respective male mold half and then the lens forming material is polymerized and/or cross-linked e.g. with ultraviolet (UV) light. Such mass production of contact lenses, which is usually performed in a closed loop process, is described, e.g., in WO 98/42497. Suitable polymers formed by photochemical polymerization of suitable prepolymers include polymers based on polyvinyl alcohols (PVA) or silicone hydrogels (SiHy) as well as based on polyethylene glycols (PEG).

During the UV light induced polymerization and/or cross-linking of the lens forming material within the molds the UV light in the respective zones which are outside of the areas required for contact lens production is masked. Thus, due to this spatial limitation of the irradiated UV light only the unmasked portion of the lens forming material in the mold cavity is hardened, whereas excess material e.g. in an overflow region or area of the mold may remain attached to the lens as "flash". In order to obtain fault-free lenses these residues of non-polymerized and/or non-cross-linked lens forming material, the "flash", must be separated from the molded lens. This separation is supported by a proper sealing of the mold halves and by a very careful shaping of the mold separation planes, in particular in the edge region of the mold cavity which defines the lens edge. The automated manufacture process is also called "full mold process" because there is no working of the lens edge required after the molding of the lens.

In order to separate the flash from the molded lens in a known manufacture process the mold is opened by moving the mold halves away from each other. The non-polymerized and/or non-cross-linked lens forming material is then flushed away from the mold halves with a jet of a flushing medium, usually water or a solvent, such as, e.g., propanol, isopropanol or the like. Subsequently the molded lens is dried, e.g. by subjecting it to a warm air flow. Most lens forming materials during polymerization and/or cross-linking have a tendency to shrink to a certain—small—extent.

Because of the shrinkage a negative pressure builds up within the mold cavity which may hamper the opening of the mold such, that an increased effort is required for the opening. During the opening of the mold and during the flushing some of the non-polymerized and/or non-cross-linked material may reach the exposed surface of the molded lens and may adhere thereto and soil the lens. Thus, very thorough surface cleaning steps for the lens surfaces should be provided in subsequent process steps.

It is therefore an object of the present invention to provide a method by which excess lens forming material, which is non-polymerized and/or non-cross-linked, may reliably be separated from the molded lens. A soiling of an exposed surface of the molded lens, whether during opening or during flushing of the mold halves, shall be avoided. Further, a method shall be provided which facilitates the opening of the mold.

SUMMARY

These and still further objects are met by a method separating excess lens forming material from a molded ophthalmic lens, in particular a contact lens, which comprises the steps specified in claim 1. The objects are also met by an apparatus for carrying out the method, wherein the apparatus comprises at least the features claimed in the independent apparatus claim. Further improvements of the invention and preferred embodiments are subject of the dependent claims.

The invention provides a method of separating excess lens forming material from a molded ophthalmic lens, in particular a contact lens. In embodiments, the method includes the steps of dosing a lens forming material into a mold cavity of a mold, the mold having female and male mold halves, applying energy to polymerize and/or crosslink the lens forming material, and then flushing from the mold halves the non-polymerized and/or non-cross-linked (i.e., excess) lens forming material with a jet of a fluid flushing medium. Subsequently the molded lens is dried. The step of flushing is accomplished with the mold halves being arranged in a closed position.

By keeping the female and male mold halves in the closed position during the removal of excess lens forming material the lens surfaces remain covered by respective molding surfaces of the female and male mold halves. Thus, an accidental soiling of an exposed lens surface is reliably avoided. Also drying of the molded lens may be accomplished in the closed mold.

In an exemplary embodiment of the invention for the flushing of the mold halves the flushing medium is injected into a peripheral zone of the mold cavity through a feed channel. Then the flushing medium is discharged through a discharge channel together with the excess lens forming material which is non-polymerized and/or non-cross-linked. The separation process is straightforward and does not require a specific handling of the mold halves or of the molded lens.

In order to ensure a proper alignment and sealing of the female and male mold halves, they may be axially guided such as in a guide sleeve. The guide sleeve is provided with feed and discharge ports which are connected with the feed channel and the discharge channel, respectively. At least the feed port may be shaped as a cylindrical bore, so that upon insertion of a conical tip of a corresponding feed line a sealing is accomplished.

For constructive reasons and in order to facilitate the flushing of the mold the feed channel and the discharge channel are arranged in vicinity of separation planes of the female and male mold halves. The separation planes of the female and male mold halves may be formed by annular shoulders engirding the peripheral zone of the mold cavity.

For reasons of fluid mechanics the feed channel and the discharge channel are arranged such, that the flushing medium is injected into the peripheral zone of a circumferential portion of the mold cavity substantially tangentially and after being guided around the peripheral zone, for example for about 180°, it is discharged into the discharge channel at an opposite circumferential portion of the mold cavity. With this guidance of the fluid flushing medium the flow resistance is reduced while at the same time enhancing the separation properties.

In another embodiment of the invention the flushing and separation properties are further optimized by injecting and discharging the flushing medium in directions which extend generally parallel to each other.

In principle flushing can be accomplished with a gaseous medium such as air or an inert gas, for example nitrogen. In a practical embodiment of the invention the molded ophthalmic lens, however, is flushed with a liquid flushing medium. The liquid flushing medium may be selected to be water or a solvent, such as, for example, propanol, isopropanol and the like.

After the flushing the molded lens may be dried by such methods as subjecting it to a heated gas stream, for example by subjecting it to a stream of heated air. In an exemplary embodiment of the invention the heated gas stream is introduced through the same feed channel as the flushing medium and it is discharged through the discharge channel. It is to be noted that the flow of the heated gas stream may also be conducted in the opposite direction, where the gas stream enters the mold through the discharge channel and is expelled through the feed channel.

In order to facilitate the opening of the mold for removal of the molded lens, after the drying of the molded lens, the discharge channel through which the heated gas stream is discharged, is closed. By prohibiting the expelling of the gas stream for a short period of time, an overpressure is built up which supports or assists in the opening of the mold by moving the female and male mold halves away from each other. The magnitude of the overpressure may be controlled by the volume of the gas stream and/or by the time during which the gas stream is prohibited from exiting the closed mold.

An apparatus for carrying out the method according to the embodiments of the method includes a female and a male mold half which, in a closed position, define a mold cavity. The female and male mold halves are guided axially in a guide sleeve. The apparatus also includes a feed channel and a discharge channel which open towards feed port and a discharge port, respectively, at a circumference of the guide sleeve and are in connection with a peripheral zone of the mold cavity.

For constructive reasons the feed and the discharge channel, respectively, are arranged in vicinity of separation planes of the female and male mold halves.

In order to enhance the separation properties and further to reduce flow resistance the feed and the discharge channels extend substantially tangentially to the peripheral zone of the mold cavity. In another embodiment of the apparatus the feed channel and the discharge channel open to the peripheral zone of the mold cavity at opposite sides of a circumference of the mold cavity. The separation properties and flow characteristics of the flush medium may be further enhanced by having the feed and the discharge channels extend in a generally parallel direction.

To ensure a proper sealing of a feed line for the flushing medium, which is attached to the feed port, the latter is shaped as a cylindrical bore and is adapted such, that upon insertion of a conical tip of a feed line a sealing is achieved. The combination of a conical tip and a cylindrical bore results in a line contact which provides a sufficient sealing even if the two sealing components are not exactly aligned with each other.

These and still further features and advantages of the invention will become apparent from the following description of an exemplary embodiment thereof, reference being made to the schematic drawings, which are not to scale, in which

DETAILED DESCRIPTION

The following description of an exemplary embodiment of the invention is for illustrative purposes only and is not intended to limit of the scope of the invention.

The invention is exemplified with reference to the manufacture of ophthalmic lenses, in particular contact lenses, in a so-called full mold process. In this known automated production process a large number of contact lenses is manufactured with reusable molds in a closed loop process. A number of reusable molds, which each comprise associated female and male mold halves, are usually arranged in side by side configuration in worktrays which are transported consecutively through the individual treatment stations of a production line. The treatment stations comprise a dosing station, in which a lens forming material, usually a prepolymer or polymer solution, is metered into the mold, a polymerization station, in which the lens forming material is polymerized and/or cross-linked. During the UV light induced polymerization and/or cross-linking of the lens forming material within the molds the UV light in the respective zones which are outside of the areas required for contact lens production is masked. Thus, due to this spatial limitation of the irradiated UV light only the unmasked portion of the lens forming material in the mold cavity is hardened, whereas excess material e.g. in an overflow of the mold remains attached to the lens as "flash". In order to obtain fault-free lenses these residues of non-polymerized and/or non-cross-linked lens forming material, the "flash" must be separated from the molded lens.

The contact lenses are then removed from the molds and transported through an extraction, rinsing and washing station, a hydration station, a lens inspection station, a packaging station, and a sorting and storage station. Suitable lens forming materials include polymers formed by photochemical polymerization of suitable prepolymers include polymers based on polyvinyl alcohols (PVA) or silicone hydrogels (SiHy) as well as based on polyethylene glycols (PEG).

Figure 1:
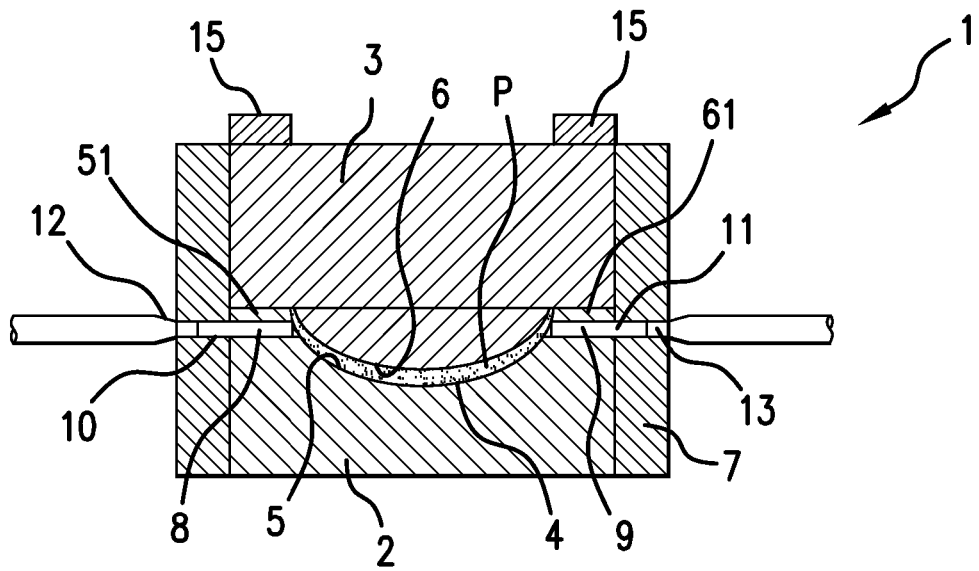
FIG. 1 is an axially sectioned view of a mold with female and male mold halves in the closed state and held in a guide sleeve.

FIG. 1 shows an axially sectioned view of a typical mold as is used in so-called full mold processes, which is generally designated with reference numeral 1. The mold 1 comprises a female mold half 2 with a first molding surface 5 and a male mold half 3 with a second molding surface 6. In the shown closed state of the mold 1 the first and second molding surfaces 5, 6 delimit a mold cavity 4, which corresponds in shape to that of the ophthalmic lens to be manufactured. First and second annular shoulders 51, 61, which constitute mold separation planes, are abutting each other. At least one of the mold halves 2, 3 is transparent to UV light. Usually the mold halves are made from quartz or glass. The female and male mold halves 2, 3 are held circumferentially in a sliding fit of a guide sleeve 7 which allows a relative axial movement of the two mold halves 2, 3. The guide sleeve 7 in which the mold halves 2, 3 are held in a sliding fit not only serves for an axial guidance of the mold halves 2, 3 but also constitutes a circumferential sealing for the two associated mold halves 2, 3, which is substantially gas tight.

The mold cavity 4 is shown filled with a lens forming material P. On top of the male mold half 3 there is indicated an annular mask 15 which masks those zones of the mold cavity 4 which are outside of the areas required for contact lens production from irradiation with UV light. Thus, due to this spatial limitation of the irradiated UV light only the unmasked portion of the lens forming material P in the mold cavity 4 is hardened, whereas excess material e.g. in an overflow of the mold remains attached to the lens as "flash".

For removing flash, i.e. the excess lens forming material P which has not been polymerized and/or cross-linked, the mold is provided with a feed channel 8 and with a discharge channel 9 which both extend in vicinity of the first and second annular shoulders 51, 61 which constitute the separation planes of the mold 1. In the embodiment shown in FIG. 1 the feed and the discharge channels 8, 9 extend about radially in the female mold half 2. The feed and the discharge channels 8, 9 open towards the mold cavity in a peripheral zone of the mold cavity. They are connected with a feed port 10 and a discharge port 11, respectively, extending through the guide sleeve 7. At least the feed port 10 is adapted to sealingly receive a conical tip 12 of a feed line. For that purpose the feed port 10 has the shape of a cylindrical bore. When the conical tip 12 of the feed line is inserted into the cylindrically shaped feed port 10, a line contact is established, which seals, even if the two sealing partners—tip 12 and feed port 10—are not in exact axial alignment. By a proper selection of the materials for the tip of the feed line and for the guide sleeve wear of the sealing partners can be reduced to a minimum. According to the embodiment depicted in FIG. 1 the discharge port 11 is cylindrically shaped, too. Correspondingly, a discharge line with a conical tip 13 may be inserted sealingly into the discharge port 11.

To remove the excess lens forming material a flushing medium is used. As stated, in principle the flushing medium can be gaseous, such as air or heated air, or an inert gas, although a liquid flushing medium such as water or solvents such as, for example, alcohols or aqueous solutions of alcohols such as propanol, isopropanol and the like may be more desirably used. The flushing medium is injected into the peripheral zone of the mold cavity 4 through the feed channel 8, and separates the non-polymerized and/or non-cross-linked lens forming material from the formed lens. The flushing medium is injected into the mold cavity 4, e.g., with a pressure sufficient to remove or wash off the non-polymerized lens forming material, for example with a pressure of about 1 bar to about 5 bar. The flushing medium and the separated non-polymerized and/or non-cross-linked lens forming material are then discharged from the mold through the discharge channel 9 and the attached discharge line. The directions of feed and discharging the flushing medium run about parallel to each other into the same direction. After the separation from the flash, the formed lens is dried. For that purpose a heated gas, such as, e.g., heated air, is injected through the feed channel 8 into the mold 1 and discharged through the discharge channel 9 or vice versa.

At the end of the drying process for a certain short period of time the discharge of the heated gas may desirably prohibited by closing the discharge port. During that period of time an overpressure is built up within the mold 1, which facilitates the opening of the mold 1. The magnitude of the overpressure may be controlled by the volume of the gas stream and/or by the time during which the gas stream is prohibited from exiting the closed mold.

Figure 2:
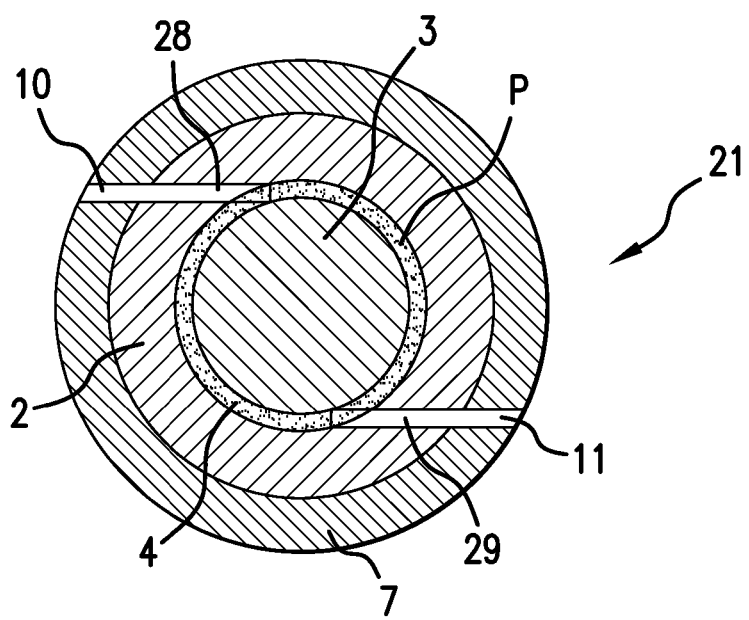
FIG. 2 is a view of another embodiment of a mold sectioned along a horizontal plane including feed and discharge channels.

The embodiment of a mold shown in FIG. 2 is of a very similar construction to that of FIG. 1. Therefore, like components are designated with like reference numerals. The mold is generally designated with reference numeral 21 and is shown in a cross sectional view along a horizontal section plane which includes feed and discharge channels which are designated with reference numerals 28 and 29, respectively. The mold comprises female and male mold halves 2, 3, which are guided in the sliding fit of a guide sleeve 7. The mold cavity 4 is shown filled with a lens forming material P. The embodiment according to FIG. 2 distinguishes from the embodiment depicted in FIG. 1 in the arrangement of the feed and discharge channels 28, 29. More specifically, for reasons of fluid mechanics the feed and the discharge channels 28, 29 extend about tangent to the peripheral zone of the mold cavity 4 and are spaced from each other an angular distance of about 180° such, that they open into the mold cavity 4 at opposite circumferential portions thereof. With this guidance of the fluid flushing medium the flow resistance is reduced while at the same time enhancing the separation properties.

The invention claimed is:

1. An apparatus for forming an ophthalmic lens, and separating excess lens forming material from the ophthalmic lens comprising a female and a male mold half which in a closed position define a mold cavity, and which are guided axially in a guide sleeve, the apparatus further comprising a feed channel and a discharge channel which open towards a feed port and a discharge port, respectively, at a circumference of the guide sleeve and are in connection with a peripheral zone of the mold cavity; and wherein the feed channel and the discharge channel extend tangentially to the peripheral zone of the mold cavity; and wherein the feed channel and the discharge channels open to the peripheral zone of the mold cavity at opposite sides of a circumference of the mold cavity and wherein for flushing of the mold halves, a flushing medium is injected into the feed channel and wherein the flushing medium together with the excess lens forming material is discharged through the discharge channel while the mold halves are arranged in a closed position to separate excess lens forming material from the ophthalmic lens.

2. The apparatus according to claim 1, wherein the feed channel and the discharge channel, respectively, are arranged in vicinity of separation planes of the female and male mold halves.

3. The apparatus according to claim 1, wherein the feed channel and the discharge channel extend in a generally parallel direction.

4. The apparatus according to claim 1, wherein at least the feed port has a cylindrical shape and is adapted such, that upon insertion of a conical tip of a feed line a sealing is achieved.

5. The apparatus according to claim 2, wherein at least the feed port has a cylindrical shape and is adapted such, that upon insertion of a conical tip of a feed line a sealing is achieved.

\* \* \* \* \*